Oct. 4, 1966 R. L. KOSSAN ET AL 3,276,317
ADAPTER RAIL LATCH MECHANISM
Original Filed March 26, 1963 8 Sheets-Sheet 8

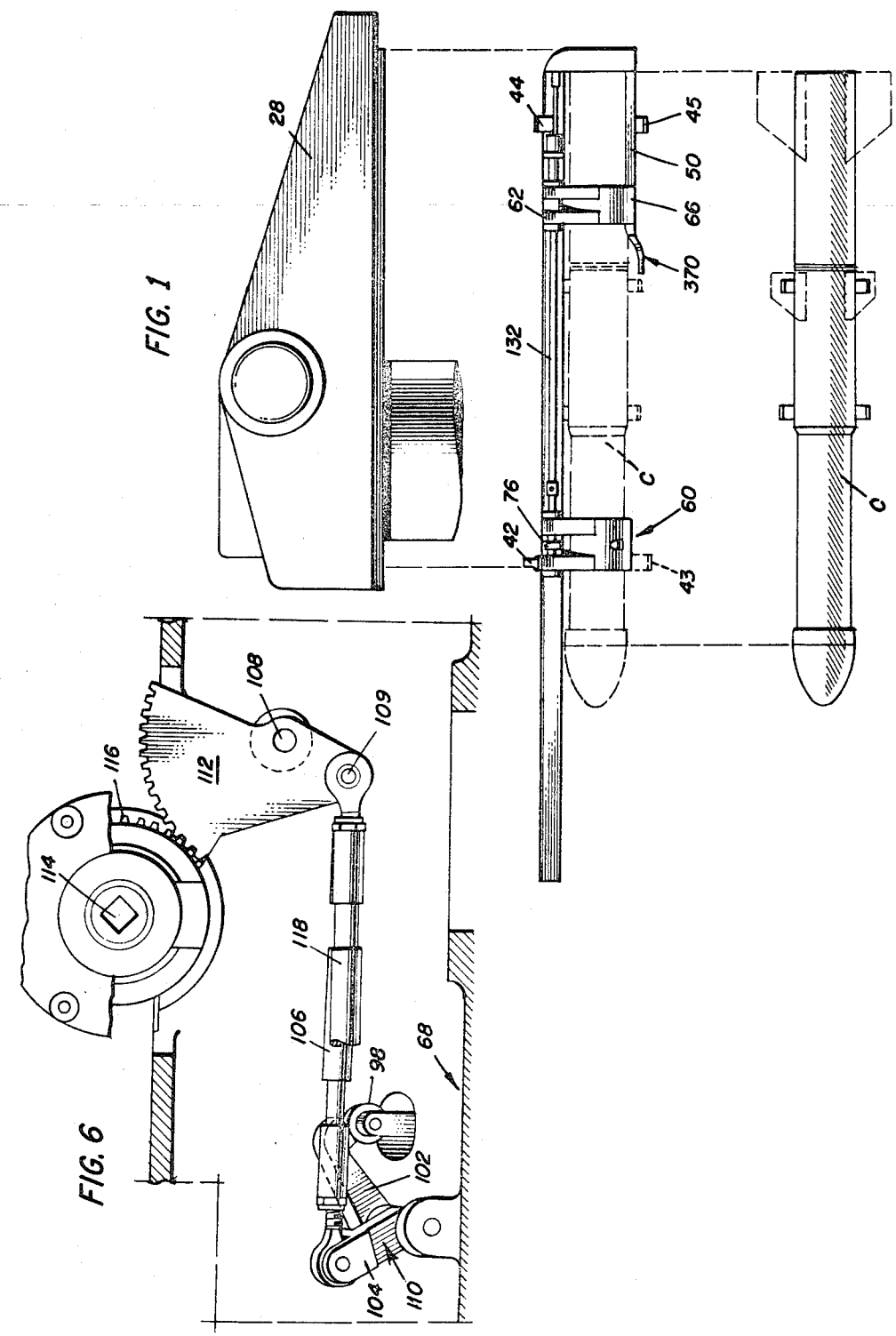

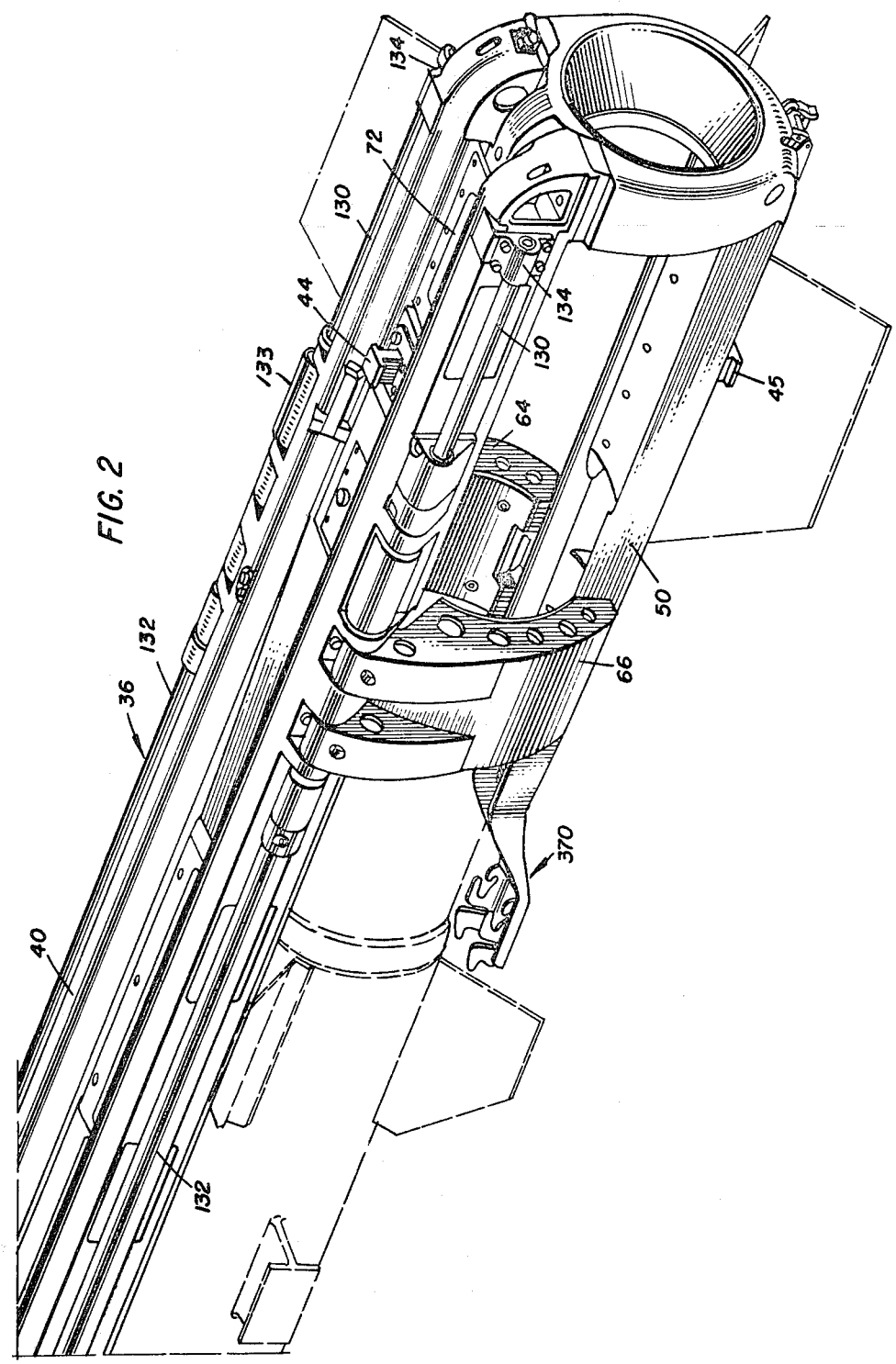

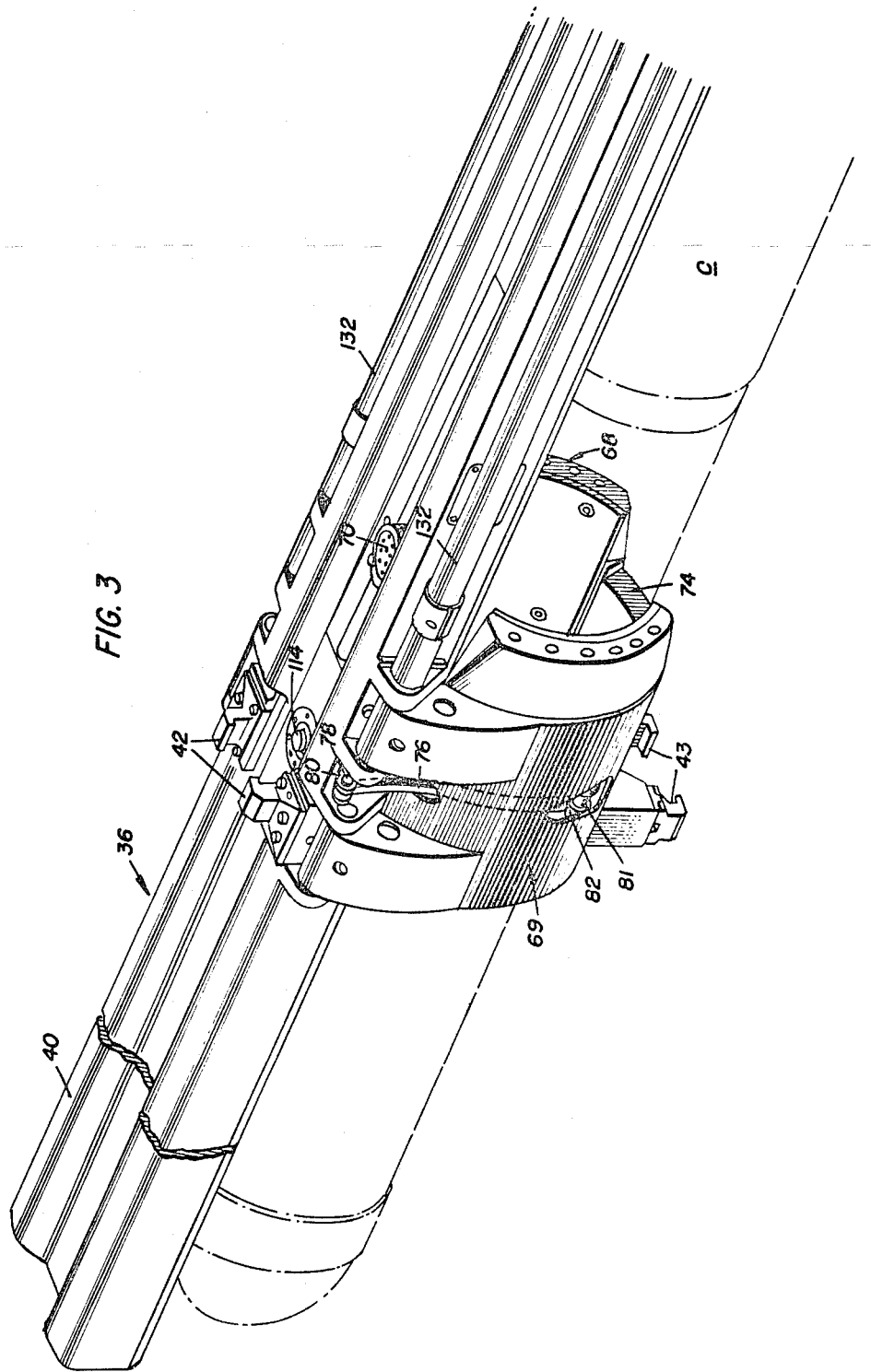

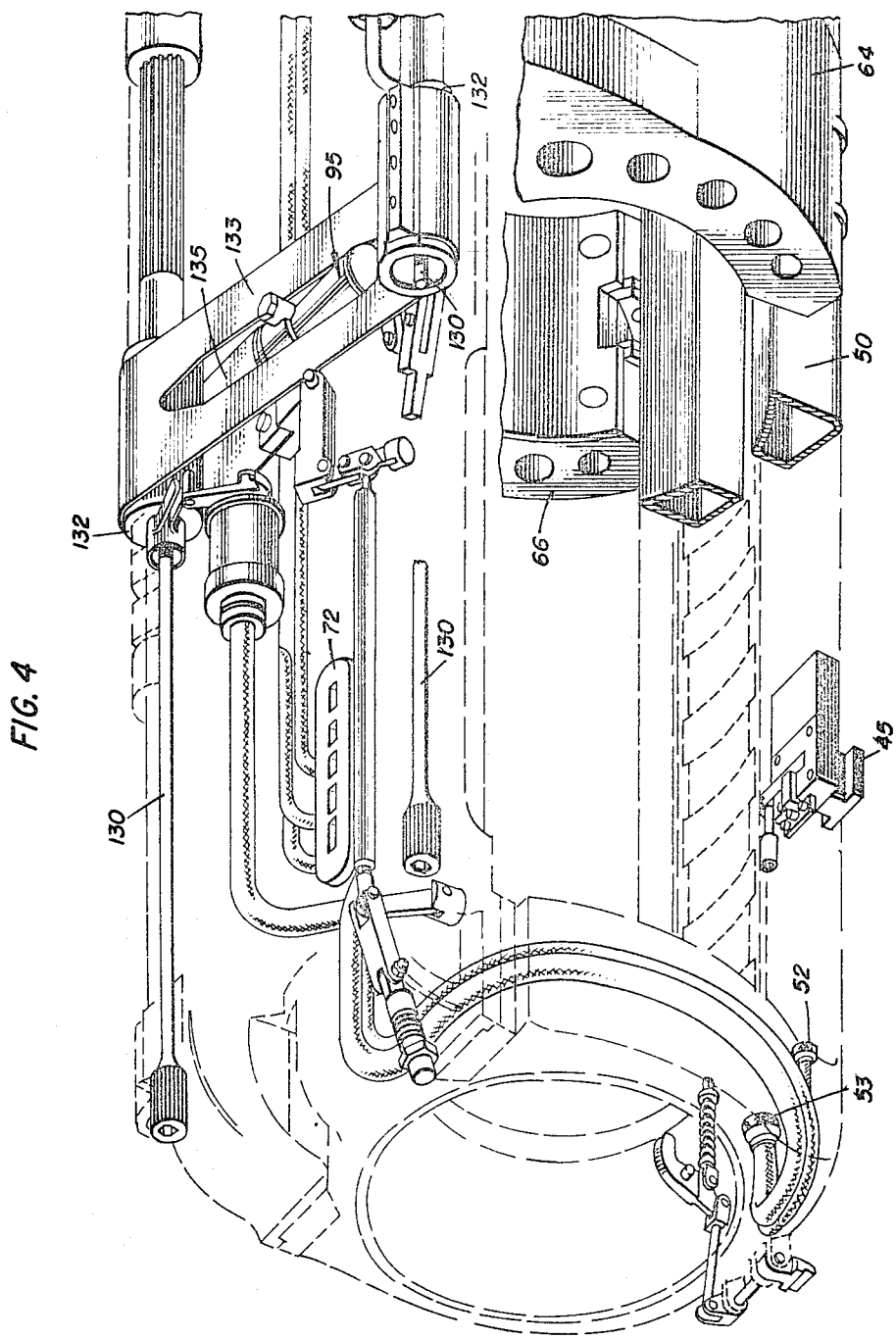

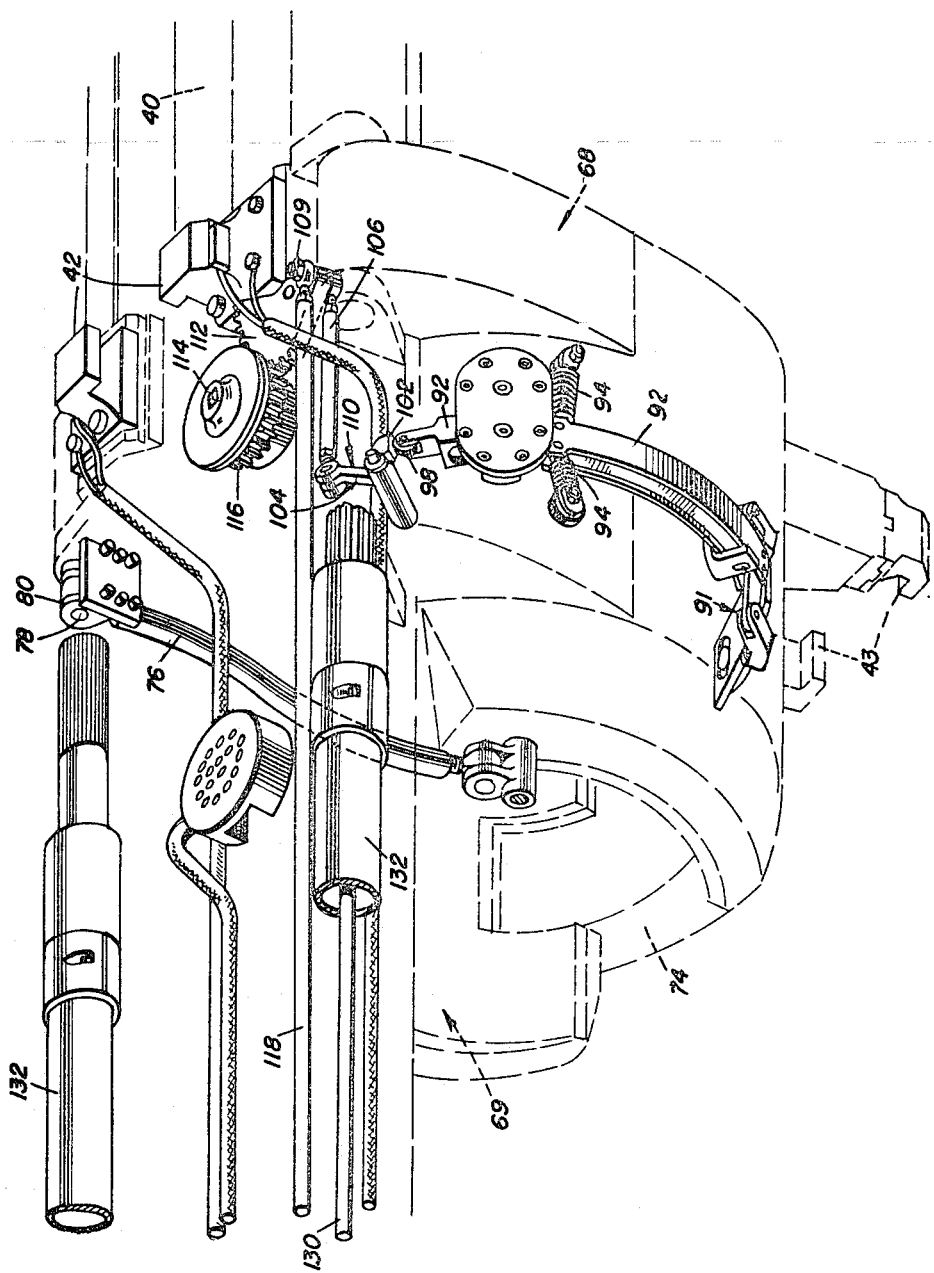

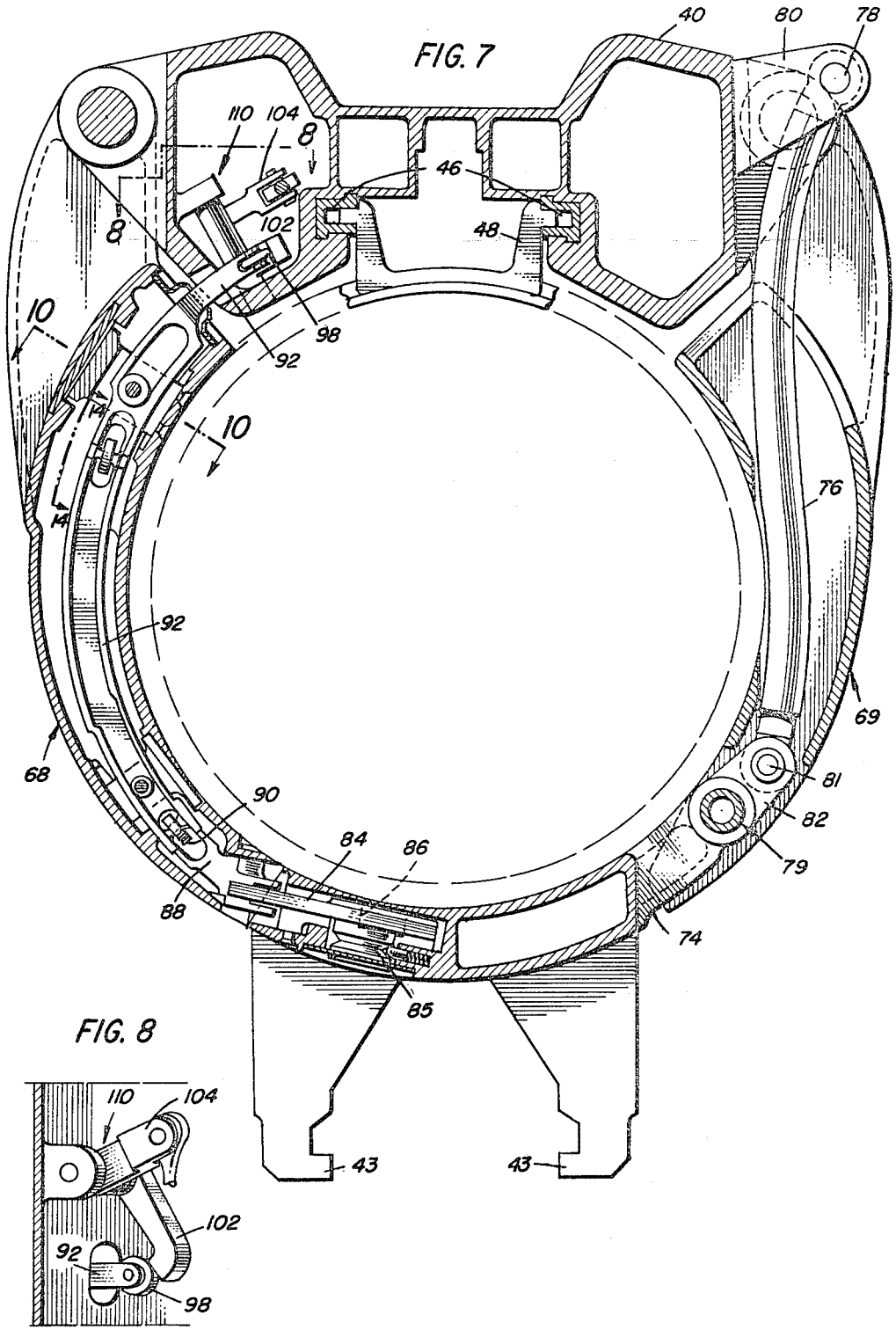

United States Patent Office 3,276,317
Patented Oct. 4, 1966

3,276,317
ADAPTER RAIL LATCH MECHANISM
Robert L. Kossan, Adelphi, Md., Robert E. Carlberg, McLean, Va., Louis H. Weber, Rockville, and Richard H. Alien, Beltsville, Md., and Palmer G. Wermager, Minneapolis, John L. Scheurich, Excelsior, and Bertram J. Matson, Minneapolis, Minn., assignors, by direct and mesne assignments, to the United States of America as represented by the Secretary of the Navy
Original application Mar. 26, 1963, Ser. No. 268,496, now Patent No. 3,215,040, dated Nov. 2, 1965. Divided and this application Apr. 30, 1964, Ser. No. 373,122
2 Claims. (Cl. 89—1.5)

This application is a division of copending U.S. Application Serial No. 268,496, filed March 26, 1963, by the present applicants, and which matured into U.S. Patent 3,215,040 on November 2, 1965.

This invention relates to a latch mechanism and more particularly to a latch mechanism for adapter rail for use in missile launchers.

An object of the present invention is to provide a releasable latch means for locking a snubber around a missile.

Other objects and many of the attendant advantages of this invention will be readily appreciated as the same becomes better understood by reference to the following detailed description when considered in connection with the accompanying drawings wherein:

FIG. 1 is a composite view in elevation of a launcher arm illustrating the manner in which the missile is secured to the adapter rail and the adapter rail supported by the launcher arm;

FIG. 2 is an isometric view of the rear portion of the adapter rail with a missile secured thereby;

FIG. 3 is an isometric view of the forward portion of the rail showing a missile secured thereby;

FIG. 4 is a dimetric view with portions thereof illustrated in fragmentary form and other portions illustrated in phantom form of the rear portion of the adapter rail;

FIG. 5 is a dimetric view with portions thereof illustrated in fragmentary form and other portions illustrated in phantom form schematic of the forward portion of the adapter rail;

FIG. 6 is a detail view of the arming tool and linkage means for the clamp release mechanism;

FIG. 7 is a cross section of the adapter rail taken through the forward snubbers;

FIG. 8 is a view taken on line 8—8 of FIG. 7 showing the bell crank linkage for the clamp release in the forward snubber;

Figure 9:
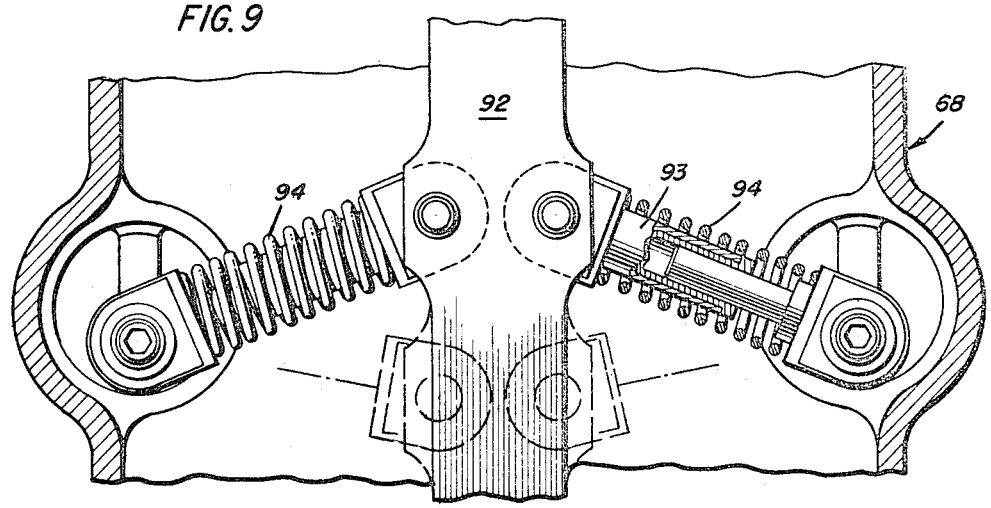
FIG. 9 is a view taken on line 9—9 of FIG. 7 showing the details of the bias means for the push rod.

Referring now to the details of the drawings, FIG. 1 shows a missile launcher arm 28 of a missile launcher 30 which by virtue of the use of an adapter rail incorporating the clamp release mechanism of the present invention it is capable of handling and launching three different types of missiles, hereinafter referred to as missile A, missile B, and missile C. The missile launching system as initially constructed accommodates a given missile A, and through the use of inserts in the trays on the ready service ring, the system provides a capability to handle a missile B, which is slightly smaller but has the same lug configuration. A much smaller missile, such as missile C, normally could not be successfully fired from the missile launcher 30. However, by using the adapter rail 36 it is possible to utilize a system designed for one missile in the launching of an entirely different missile. FIG. 1 shows the missile C engaged by an adapter rail 36 and displaced below the launcher arm 28.

The relationship of the missile C to the adapter rail 36 and the rail's relationship to the track 29 of the launching system, as represented by the launcher arm 28, is shown in an expanded view.

Referring now to FIGS. 2 and 3, the adapter rail 36 is constructed of a beam 40, preferably of welded steel construction, and has forward and aft shoes 42 and 44 respectively, which shoes simulate those for missiles A and B, mounted on the top surface thereof. These upper shoes 42 and 44 are utilized to support the adapter rail and the missile C in the feeder mechanism 26 and on the launcher arm track 29. Shoe tracks 46, as shown in FIG. 7, for accommodating the shoes 48 of missile C are mounted on the underside of beam 40. A cantilever beam 50 is bolted to the aft end of the beam 40 and contains two connectors 52 and 53 for attaching an umbilical cord 54, as shown in FIG. 4. The umbilical cord provides electrical connections to missile C from both the launcher contactor pad 70 and the loader contactor pad 72. These two pads are positioned on the beam 40 to contact the connectors provided in the system 20 for contacting the missiles A and B. The cantilever beam 50 has a U-shaped groove on its underside for containing the umbilical cord 54. An aft shoe 45, similar to aft shoe 44, is mounted on the underside of the cantilever beam 50.

The missile C is retained on the adapter rail by means of forward and aft snubbers 60 and 62 respectively, which are mounted on the beam 40. The snubbers 60 and 62 are mounted on off-center bearings so that as they close they do not contact the missile until uniform pressure is applied to the whole area of contact. The aft snubber 62 has two arms 64 and 66 which close against and contact the cantilever beam 50 and form therewith a complete lateral enclosure for missile C. The forward snubber 60, as shown in FIGS. 3 and 7, has a right arm 68 and a left arm 69. A connecting arm 74 is hinged to left arm 69 and latches to the right arm 68 to form a complete lateral enclosure for missile C. A forward shoe 43, similar to forward shoe 42, is mounted on the underside of connecting arm 74. A curved rod 76 is pivotally mounted by means of pin 78 in clevis 80 which is attached to beam 40. The other end of curved rod 76 is pivotally mounted in clevis 82 by means of pin 81. Clevis 82 is rigidly attached to rod 79 which is rotatably mounted in left arm 69. Connecting arm 74 is rigidly attached to rod 79. Thus, as the left arm 69 is rotated upward, rod 76 will rotate the clevis 82 and rod 79 will cause the connecting arm 74 to fold inward as shown in FIG. 7. This is to permit the adapter rail to be taken back through the system without the necessity of latching the snubbers.

Figure 10:
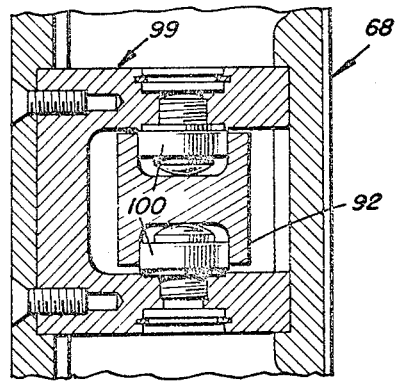
FIG. 10 is a section taken on line 10—10 of FIG. 7 and showing a detail of a typical guide roller arrangement.
Figure 11:
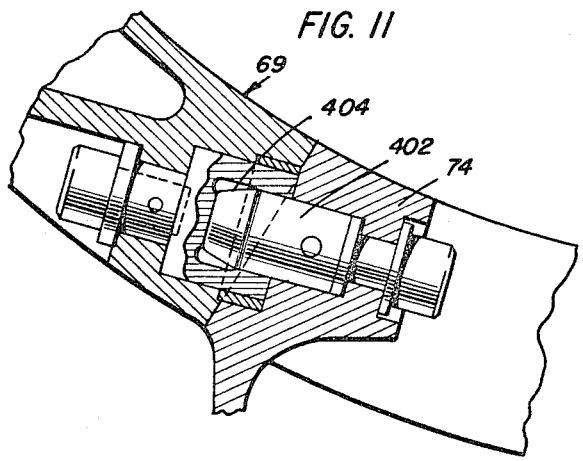
FIG. 11 is a detail view of one of the guide posts on the clamp.
Figure 12:
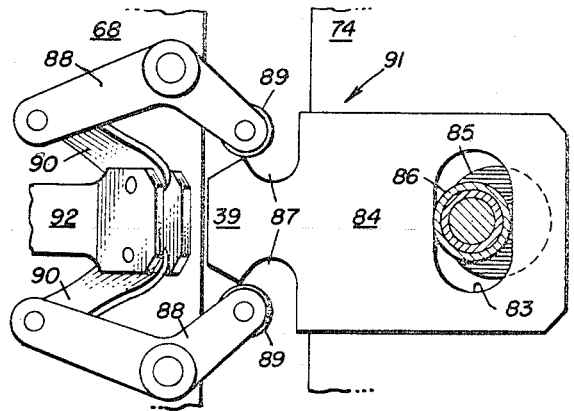
FIG. 12 is a bottom plan view of the forward snubber latch assembly showing the initial stage of engagement of the latch.
Figure 12A:
FIG. 12a is a view of the lock position indicator in the engage position.
Figure 13:
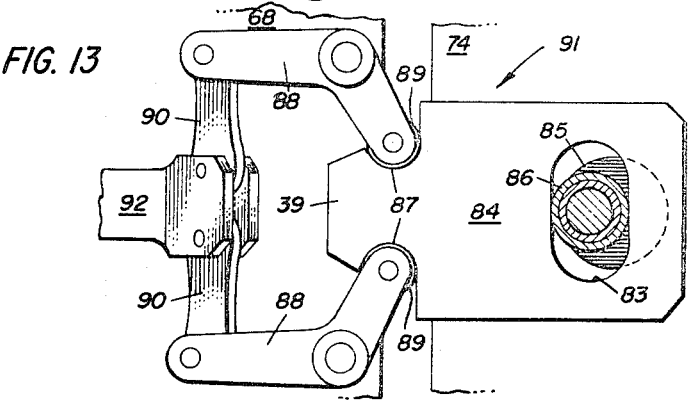
FIG. 13 is a view similar to FIG. 12 in which the latch has been completely engaged.
Figure 13A:
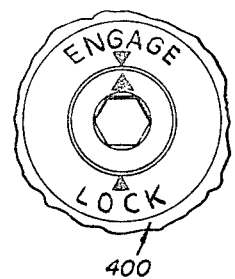
FIG. 13a is a view similar to FIG. 12a showing the lock position indicator in engage position.
Figure 14:
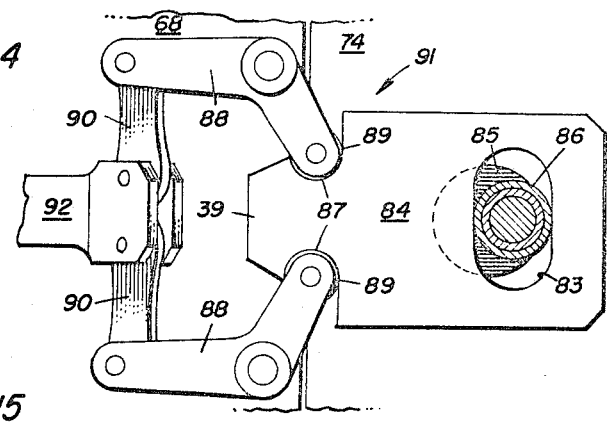
FIG. 14 is a view similar to FIGS. 12 and 13 in which the latch has been locked in position.
Figure 14A:
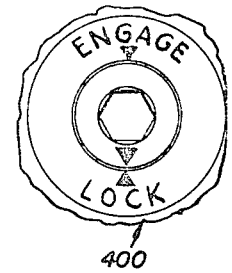
FIG. 14a is a view similar to FIGS. 12a and 13a in which the lock position indicator has been turned to lock position.
Figure 15:
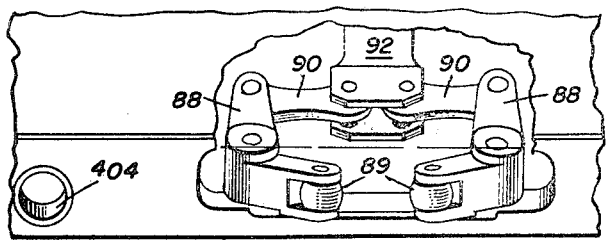
FIG. 15 is an edge view of the right arm of the forward snubber with parts broken away to show the latch linkage.

The forward snubber 60 is latched in closed position by means of connecting arm 74 being latched to right arm 68 by latch 91, which comprises a plate 84, see FIGS. 7 and 12 through 15, mounted on take-up cam 86. Plate 84 has a tapered guide portion 39 on one end terminating in notches 87 and a slot 83 in the other end through which cam 86 extends. Cam 86 is an eccentric affixed to a wheel 85 rotatably mounted in connecting arm 74, so that rotation of wheel 85 will cause translation of cam 86 which will cause movement of plate 84. A curved push rod 92, having a roller 98 on its upper end, is slideably mounted in the right arm 68. Push rod 92 is I-shaped in cross section and is provided with guide rollers 100 mounted in units 99 between the walls of arm 68 to support and guide the push rod 92 as it moves. See FIG. 10. Two compression springs 94, shown in FIG. 9, are interposed between the sides of push rod 92 and the right arm 68 and act to keep the push rod centered. These springs are mounted over telescoping members 93 which are pivotally attached at one end to the right arm 68 and at the other end to push rod 92. The members 93 are located in such a manner that the springs 94 bias the rod upward or downward depending upon whether the points of attachment of the telescoping members 93 on the push rod 92 are positioned above or below the common centerline of the points of attachment of the telescoping member 93 on the right arm 68. At its lower end, push rod 92 is connected to one arm each of a pair of bell cranks 88 by means of links 90, the bell cranks 88 being pivotally mounted on the right arm 68. Rollers 89 are mounted on the other arm of each bell crank. Before closing of the forward snubber is initiated, push rod 92 is in a downward position, as shown in dotted lines in FIG. 9, and is held there by means of the bias of springs 94. Wheel 85 is rotated to its engage position as shown in FIG. 12 and indicated by lock position indicator 400 in FIG. 12a, which moves plate 84 toward arm 68. As closing is initiated, by means to be explained hereinafter, right arm 68 approaches connecting arm 74. Rollers 89 clear guide portion 39 and contact plate 84 as shown in FIG. 12. With further approach of the two arms 68 and 74 the rollers move into notches 87 and pivot the bell cranks 88 which causes the links 90 to be straightened into aligned position as shown in FIG. 13. Wheel 85 remains unchanged as indicated in FIG. 13a. The straightening of links 90 moves the push rod 92 upward to the position shown in FIG. 9. At this point the relative approach of members 68 and 74 stops, leaving a small gap therebetween as shown in FIG. 13. Wheel 85 is then rotated to lock position as shown in FIG. 14 and indicated by the position indicator 400 in FIG. 14a. Rotation of wheel 85 causes cam 86 to move plate 84 away from right arm 68. The springs 94 hold the push rod 92 in the upward position shown in FIG. 9 so that the force exerted on the bell cranks 88 by the plate 84 will not permit the cranks 88 to rotate. This results in the right arm 68 and the connecting arm 74 being closed and locked as shown in FIG. 14. A pair of guide posts 402, as illustrated in FIG. 11, is attached to connecting arm 74 and mate with a pair of complementarily positioned guide sockets 404 in right arm 68 to position the two arms 68 and 74 as they approach each other.

The forward snubber is unlatched on the arm 28 of the launcher 30 by means of the arming tool, not shown, which is a part of the arm 28. The arming tool engages the arming socket 114 and winds or rotates the same clockwise, as viewed in FIGS. 5 and 6. A gear 116 attached to socket 114 is rotatably mounted on beam 40. Gear 116 engages a gear sector 112 and rotates the same about pivot pin 108 mounted on beam 40. A rod 106 pivotally attached to the gear sector 112 by means of pin 109 is moved to the right. A bell crank 110 shown in detail in FIG. 8 is pivotally mounted on right arm 68 and has one arm 104 attached to rod 106 by means of a pin and the other arm 102 contacting roller 98 on push rod 92. When the arming socket 114 is rotated clockwise, gear sector 112 is rotated counterclockwise causing rod 106 to rotate bell crank 110. As the crank 110 rotates, arm 102 contacts roller 98 forcing the push rod 92 downward which rotates bell cranks 88 away from notches 87 and releases the forward snubber 60.

A pair of torsion bars 130 shown in FIGS. 2 and 8 are anchored at one end by means of clamps 134 bolted to the aft end of the beam 40 and extended through torque tubes 132 to the forward snubber 60 where the bars are attached, one bar being secured to each of the arms 68 and 69. With the snubbers open, the torsion bars are preloaded to a torque of approximately 55 foot pounds each. The torsion bars 130 have opposite torques preset in them, i.e., the right hand bar has a clockwise and the left hand bar has a counterclockwise torque as viewed from the rear, so that when unlatched the bars will rotate in a counterclockwise and clockwise direction, respectively. The torque tubes 132 are attached to the torsion bars at their forward ends and at their aft ends are attached to the arms 64 and 66 of the aft snubber 62. When the forward snubber is unlatched by action of the arming socket, the torsion bars rotate and open the forward snubber. The torque tubes are also rotated by the action of the torsion bars and open the aft snubber 62.

At a point near the aft end, as shown in FIG. 4, the torque tubes 132 are connected by a steel band 133 which is wound over the top of the left hand torque tubes and attached thereto and under the bottom of the right hand torque tube and attached thereto. A second steel band 135 is attached at one end to the left hand torque tube. The other end of the second band is pinned to an extension arm 139 connected to a buffer 95.

Obviously, many modifications and variations of the present invention are possible in the light of the above teachings. It is therefore to be understood that within the scope of the appended claims the invention may be practiced otherwise than as specifically described.

What is claimed is:

1. A latch for releasably holding two members together comprising:
   a wheel rotatably mounted on one of the members,
   an eccentric on said wheel,
   a plate having a slot therein slideably mounted on said one member, said eccentric extending through said slot,
   a pair of notches in said plate,
   a pair of bell cranks having first arms and second arms pivotally mounted on the other of said members, said first arms being engageable with said notches,
   a pair of links pivotally connected to said second arms.
   a push rod pivotally connected to said links and slideably mounted on said other member,
   and bias means interposed between said rod and said other member and urging said rod away from said plate, whereby movement of said members to a point adjacent each other will cause said first arms to engage said notches and rotation of said wheel will cause said eccentric to move said plate relative to said one member and away from said other member thereby bringing the members into engagement.

2. A latch according to claim 1 in which said bias means comprises:
   a pair of telescoping members interposed between said rod and said other member, and a spring mounted over said telescoping members and urging them to extended position.

References Cited by the Examiner

UNITED STATES PATENTS

| | | | |
|---|---|---|---|
| 1,544,457 | 6/1925 | Jones | 294—106 X |
| 2,024,222 | 12/1935 | Hinchman | 294—106 X |
| 2,229,800 | 1/1941 | Dean | 294—106 |
| 2,734,373 | 2/1956 | Scherbinski | 292—341.15 X |
| 2,877,688 | 3/1959 | Markil | 89—1.5 |
| 3,093,031 | 6/1963 | Damm | 89—1.5 |

BENJAMIN A. BORCHELT, *Primary Examiner.*

SAMUEL W. ENGLE, *Examiner.*